United States Patent [19]

Amano

[11] Patent Number: 4,843,335
[45] Date of Patent: Jun. 27, 1989

[54] ACOUSTOOPTIC MODULATION DEVICE CAPABLE OF AVOIDING IMPEDANCE MISMATCHING OVER A WIDE FREQUENCY BAND

[75] Inventor: Satoru Amano, Yamanashi, Japan

[73] Assignee: Hoya Corporation, Tokyo, Japan

[21] Appl. No.: 151,445

[22] Filed: Feb. 2, 1988

Related U.S. Application Data

[63] Continuation of Ser. No. 59,001, Jun. 8, 1987, abandoned.

[30] Foreign Application Priority Data

Jul. 28, 1983 [JP] Japan ................................. 58-138458

[51] Int. Cl.⁴ .......................... G02F 1/33; G02B 5/18; G02B 27/10
[52] U.S. Cl. .................................... 332/751; 350/355; 350/358
[58] Field of Search ............... 332/7.51; 350/355, 358, 350/371

[56] References Cited

U.S. PATENT DOCUMENTS 4,696,551 9/1987 Amano et al. .................. 350/162.17

FOREIGN PATENT DOCUMENTS 0010229 1/1985 Japan .................................. 350/358

Primary Examiner—Nelson Moskowitz
Attorney, Agent, or Firm—Roberts, Spiecens & Cohen

[57] ABSTRACT

In an acoustooptic modulation device, a plurality of split light beams are produced from a beam splitter in response to a single incident light beam and projected onto partial modulators comprising acoustooptic mediums and transducers attached to the mediums, respectively. The transducers have different thicknesses to vary input impedances of the respective partial modulators and are supplied from an electric signal circuit with modulated electric signals falling within frequency bands different from one another, respectively. Preferably, modulated light beams are produced from the partial modulators through an optical system to be focussed into a predetermined geometric arrangement. The beam splitter may be a body having a pair of parallel surfaces covered with reflection and semitransparent layers, a diffraction grating, or a fiber grating.

11 Claims, 8 Drawing Sheets

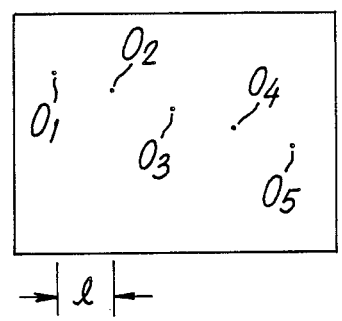
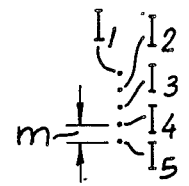
FIG. 7b
FIG. 7a
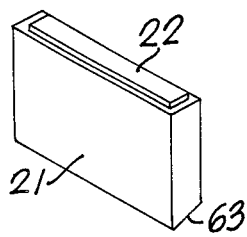
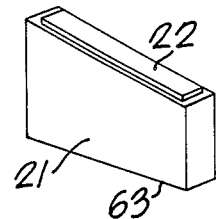
FIG. 8a
FIG. 8b
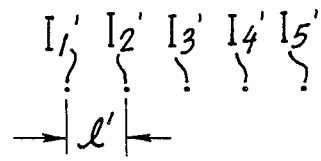
FIG. 10

ACOUSTOOPTIC MODULATION DEVICE CAPABLE OF AVOIDING IMPEDANCE MISMATCHING OVER A WIDE FREQUENCY BAND

This is a continuation on application Ser. No. 059,001 filed June 8, 1987, now abandoned.

FIELD OF THE INVENTION

This invention relates to an acoustooptic modulation device responsive to a single light beam for producing a plurality of outgoing modulated light beams subjected to optical modulation.

In general, an acoustooptic modulation device of the type described is for use in optically recording information signals on a recording medium, such as a film or the like.

BACKGROUND AND PRIOR ART

A conventional acoustooptic modulation device is described in Japanese Unexamined Patent Publication No. Syo 53-72,643, namely, 72,643/1978. As will later be described with reference to figures of the accompanying drawing, the acoustooptic modulation device comprises a single acoustooptic medium, a transducer attached to the acoustooptic medium, and an electric signal modulator connected to the transducer. The electric signal modulator amplitude modulates a plurality of carrier waves of different frequencies by electric signals to supply the transducer with modulated carrier waves, respectively. Acoustic or ultrasonic waves are propagated from the transducer to the acoustooptic medium in response to the modulated carrier waves and interact with an incident light beam which is given from an optical light source to the acoustooptic medium. As a result, the incident light beam is acoustooptically modulated by the acoustic waves into modulated light beams which are recorded on the recording medium as the information signals.

The acoustooptic modulation device is disadvantageous in that the modulated light beams are inevitably reduced in intensity, namely, luminous energy on account of an increase of a reflection loss or a variation of diffraction efficiency.

In the copending U.S. patent application Ser. No. 517,346 filed on July 26, 1983, by S. Amano et al, an acoustooptic modulation device is proposed wherein a plurality of transducers are attached to a single acoustooptic medium along a plurality of incident light beams, respectively. The transducers are activated by modulated electric signals to individually optically modulate the incident light beams, respectively. It should be noted here that each modulated electric signal is produced by modulating a single carrier wave of a common frequency and consequently falls within a common frequency band. With this structure, it is possible to reduce the reflection loss and to improve the diffraction efficiency insofar as each modulated signal falls within a common frequency band.

However, the reflection loss and the diffraction efficiency are adversely affected when each carrier frequency is varied over a wide frequency band.

SUMMARY OF THE INVENTION

It is an object of this invention to provide an acoustooptic modulation device which is capable of carrying out acoustooptic modulation by the use of a plurality of carrier frequencies.

It is another object of this invention to provide an acoustooptic modulation device of the type described, which can avoid an increase in reflection loss.

It is a further object of this invention to provide an acoustooptic modulation device of the type described, which is capable of improving diffraction efficiency.

According to this invention, an acoustooptic modulation device is responsive to a single incident light beam for producing a predetermined number of outgoing modulated light beams subjected to acoustooptic modulation. The acoustooptic modulation device comprises beam splitting means for splitting the incident light beam into split light beams equal in number to the predetermined number, electric signal producing means for producing the predetermined number of electric data signals, carrier signal producing means for producing the predetermined number of carrier signals having frequency bands different from one another, electrically modulating means responsive to the electric data signals and the carrier signals for electrically modulating the carrier signals by the electric data signals, respectively, to produce modulated electric signals, and acoustooptic modulation means equal in number to the predetermined number for carrying out acoustooptic modulation of the split light beams in response to the modulated electric signals to produce acoustooptically modulated light beams as the outgoing modulated light beams, respectively.

BRIEF DESCRIPTION OF THE DRAWING

FIGS. 7(a) and 7(b) are views for use in describing operation of the acoustooptic modulation device illustrated in FIG. 4;

FIGS. 8(a) and 8(b) are perspective views of partial modulators applicable to the acoustooptic modulation device illustrated in FIG. 4;

FIG. 10 is a view for use in describing operation of the acoustooptic modulation device illustrated in FIG. 9;

Figure 1:
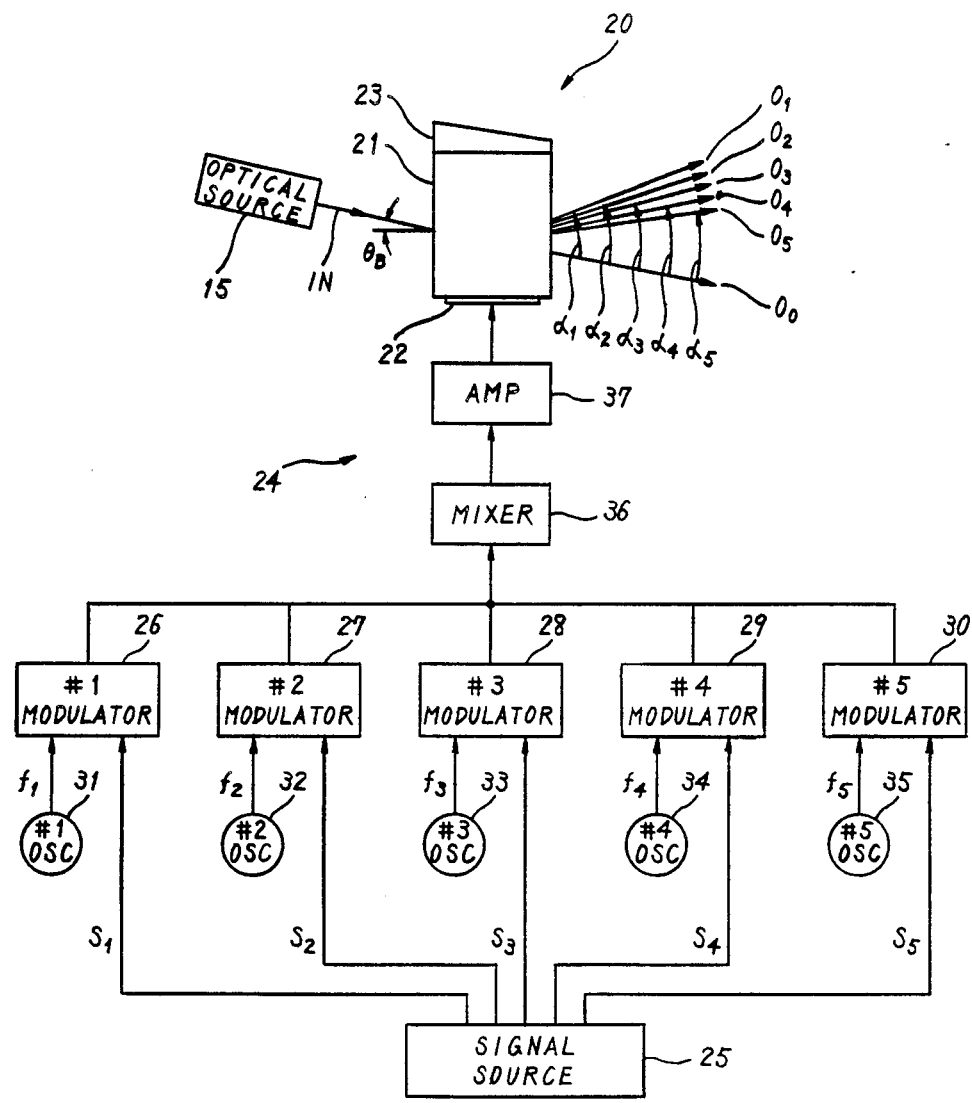
FIG. 1 is a block diagram of a conventional acoustooptic modulation device.

DESCRIPTION OF THE PREFERRED EMBODIMENTS:

Referring to FIG. 1, a conventional acoustooptic modulation device is similar to that described in the above-mentioned Japanese Unexamined Patent Publication. The illustrated acoustooptic modulation device is supplied from an optical source 15 with an incident light beam IN to produce first through fifth outgoing or exit modulated light beams $O_1$ to $O_5$ subjected to optical modulation in a manner to be described.

An acoustooptic modulator 20 comprises an acoustooptic medium 21 of a parallelepiped shape. The acoustooptic medium 21 has entrance and exit surfaces which are parallel to each other and which are directed leftwards and rightwards in FIG. 1, respectively. First and second side surfaces are extended between the entrance and the exit surfaces and directed downwards and upwards in FIG. 1, respectively. A transducer 22 is mounted on the first side surface while an acoustic absorber 23 is attached to the second side surface.

The transducer 22 is connected to an electric signal circuit 24 and is activated by modulated electric signals supplied from the electric signal circuit 24.

The electric signal circuit 24 comprises a signal source 25 for producing first through fifth electric signals $S_1$ to $S_5$. The first through the fifth electric signals $S_1$ to $S_5$ may be called first through fifth image signals, respectively, because they are optically recorded on a recording medium (not shown). The first through the fifth image signals $S_1$ to $S_5$ are delivered to first through fifth amplitude modulators 26 to 30 which are supplied from first through fifth high frequency oscillators 31 to 35 with first through fifth carrier signals, respectively. The first through the fifth carrier signals have first through fifth carrier frequencies $f_1$ to $f_5$ different from one another. Specifically, the first through the fifth carrier frequencies $f_1$ to $f_5$ are equal to 250 MHz, 225 MHz, 200 MHz, 175 MHz, and 150 MHz, respectively. Each of the first through the fifth carrier signals is amplitude modulated in each modulator by each of the first through the fifth image signals and produced as each modulated electric signal from a respective modulator. The modulated electric signals are sent through a mixer 36 and a wideband amplifier 37 to the transducer 22.

The transducer 22 converts the modulated electric signals into acoustic or ultrasonic waves which are propagated through the acoustooptic medium 21 towards the acoustic absorber 23 and are absorbed by the acoustic absorber 23. Such propagation of the acoustic waves results in a wavefront.

The incident light beam IN enters the acoustic medium 21 through the entrance surface at a Bragg angle $\theta_B$ relative to the wavefront and interacts with the acoustic waves. As a result, the incident light beam IN is subjected to optical modulation and exits through the exit surface as a zeroth-order light beam $O_0$ and a first-order diffracted light beam or beams dependent on the modulated electric signals. Specifically, each of the first-order diffracted light beams appears as the first through the fifth outgoing light beams $O_1$ to $O_5$ which correspond to the first through the fifth carrier signals, respectively.

Let a specific one of the first through the fifth carrier signals alone be supplied through the mixer 36 and the wideband amplifier 37 to the transducer 22 and have a specific carrier frequency represented by $f_i$. In this case, the zeroth-order light beam $O_0$ and a specific one of the first-order diffracted light beams $O_1$ and $O_5$ emanate from the exit surface of the acoustooptic medium 21. Let the specific one of the first-order diffracted light beams be represented by $O_i$. Under the circumstances, an angle $\alpha_i$ between $O_0$ and $O_i$ is given by:

$$\alpha_i = \sin^{-1}(\lambda f_i/v), \tag{1}$$

where $\lambda$ represents a wavelength of the light beam and $v$, a sonic velocity of the acoustic waves in the acoustooptic medium 21.

From Equation (1), it is readily understood that the angle $\alpha_i$ is dependent on the specific carrier frequency $f_i$ and can be varied by changing the carrier frequencies of the carrier signals. In the illustrated device, the angle $\alpha_i$ is variable between a maximum angle $\alpha_1$ and a minimum angle $\alpha_5$ which are determined by the first and the fifth carrier frequencies $f_1$ and $f_5$ of 250 MHz and 150 MHz, respectively.

Figure 2:
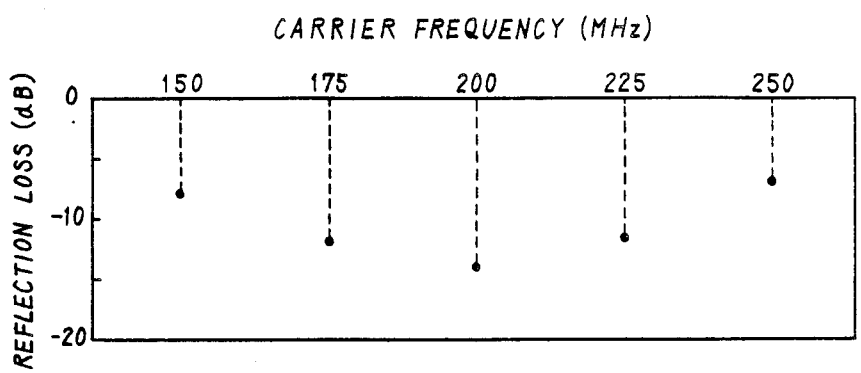
FIG. 2 is a graphical representation for use in describing a characteristic of the conventional acoustooptic modulation device illustrated in FIG. 1.

Temporarily referring to FIG. 2, reflection losses are measured at the first through the fifth carrier frequencies $f_1$ to $f_5$. As shown in FIG. 2, the reflection losses are unpleasantly varied between $-7$ and $-14$ (dB). This means that each of the first through the fifth outgoing light beams has variable luminous energy or intensity.

Such variation of the reflection losses results from impedance mismatching taking place in relation to the transducer 22. More particularly, the transducer 22 has a thickness such that an input impedance of the transducer 22 becomes equal to a desired value of, for example, 50 ohms at a predetermined carrier frequency, for example, 200 MHz. However, it is difficult to match the input impedance of the transducer 22 with the desired value over a wide frequency band, such as between 250 MHz and 150 MHz. Therefore, the impedance mismatching inevitably occurs in the acoustooptic modulation device illustrated in FIG. 1, as mentioned above.

The impedance mismatching gives rise to insufficient conversion of the modulated electric signals into the acoustic waves and to incomplete interaction between the light beam and the acoustic waves. Consequently, the luminous energy is varied at every one of the first through the fifth outgoing light beams $O_1$ to $O_5$.

Turning back to FIG. 1, the Bragg angle $\theta_B$ of the incident light beam IN is represented outside and inside of the acoustic medium 21 by:

$$\left. \begin{array}{l} \theta_B = \alpha_i/2 \\ \text{and} \quad \theta_B = \alpha_i/2N, \text{ respectively,} \end{array} \right\} \tag{2}$$

where N represents an index of refraction of the acoustooptic medium 21.

With the illustrated structure, the Bragg angle $\theta_B$ is invariable because the incident light beam IN and the acoustooptic medium 21 are spatially fixed to each other. On the other hand, an optimum Bragg angle $\theta_{B0}$ is varied for each carrier frequency, as readily understood from Equations (1) and (2). Such a deviation of the Bragg angle $\theta_B$ from each optimum Bragg angle $\theta_{B0}$ also brings about a reduction of the luminous energy of each outgoing light beam and a reduction of diffraction efficiency. The deviation will be called a Bragg angle deviation and represented by $\Delta\theta_B$.

Figure 3:
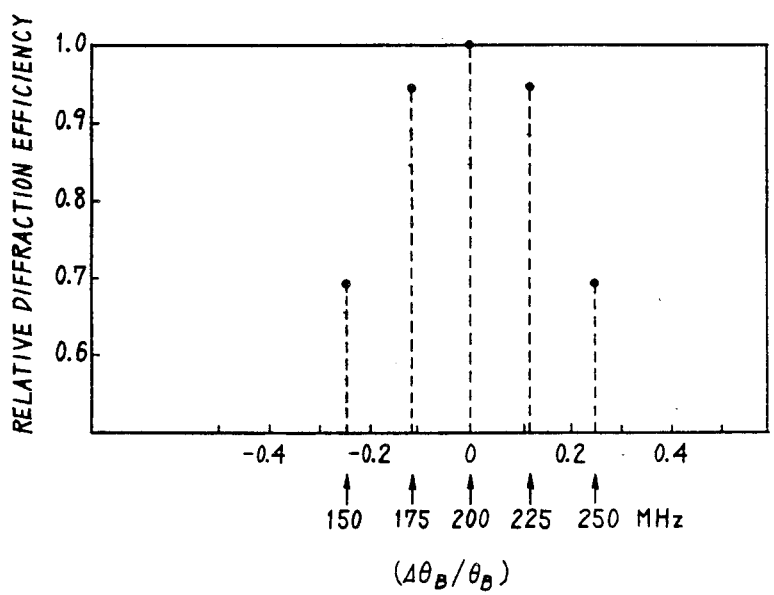
FIG. 3 is a graph for use in describing another characteristic of the conventional acoustooptic modulation device illustrated in FIG. 1.

Referring to FIG. 3, the abscissa represents a factor $(\Delta\theta_B/\theta_B)$ which is given by each Bragg angle deviation $\Delta\theta_B$ divided by the Bragg angle $\theta_B$ of the incident light beam IN while the ordinate represents relative diffraction efficiency. The Bragg angle $\theta_B$ of the incident light beam IN and the relative diffraction efficiency are determined relative to the third carrier frequency $f_3$ of 200 MHz. Accordingly, the factor ($\Delta\theta_B/\theta_B$) and the relative diffraction efficiency take 0 and 1, respectively.

As shown in FIG. 3, the factors ($\Delta\theta_B/\theta_B$) become equal to +0.25 and −0.25 for the first and the fifth carrier frequencies $f_1$ and $f_5$ of 250 MHz and 150 MHz, respectively. The relative diffraction efficiency is reduced to about 0.7 at each of the first and the fifth carrier frequencies $f_1$ and $f_5$.

In the illustrated device, two or more carrier signals are often supplied to the transducer 22 when two or more image signals takes a logic "1" level, although FIG. 3 exhibits the relative diffraction efficiency appearing when only one of the image signals $S_1$ to $S_5$ takes the logic "1" level with the remaining image signals kept at the logic "0" level.

Let all of the first through the fifth image signals $S_1$ to $S_5$ take the logic "1" level. In this event, the luminous energy of each outgoing light beam $O_1$ to $O_5$ is reduced to one-fifth of the illustrated relative diffraction efficiency. As a result, the luminous energy of the first carrier signal of 250 MHz is as low as 0.14 when the transducer 22 is activated by all of the first through the fifth carrier signals. Inasmuch as the luminous energy is equal to 0.7 when the transducer 22 is driven only by the first carrier signal, a luminous energy difference given by subtracting 0.14 from 0.7 becomes equal to 0.56.

Figure 4:
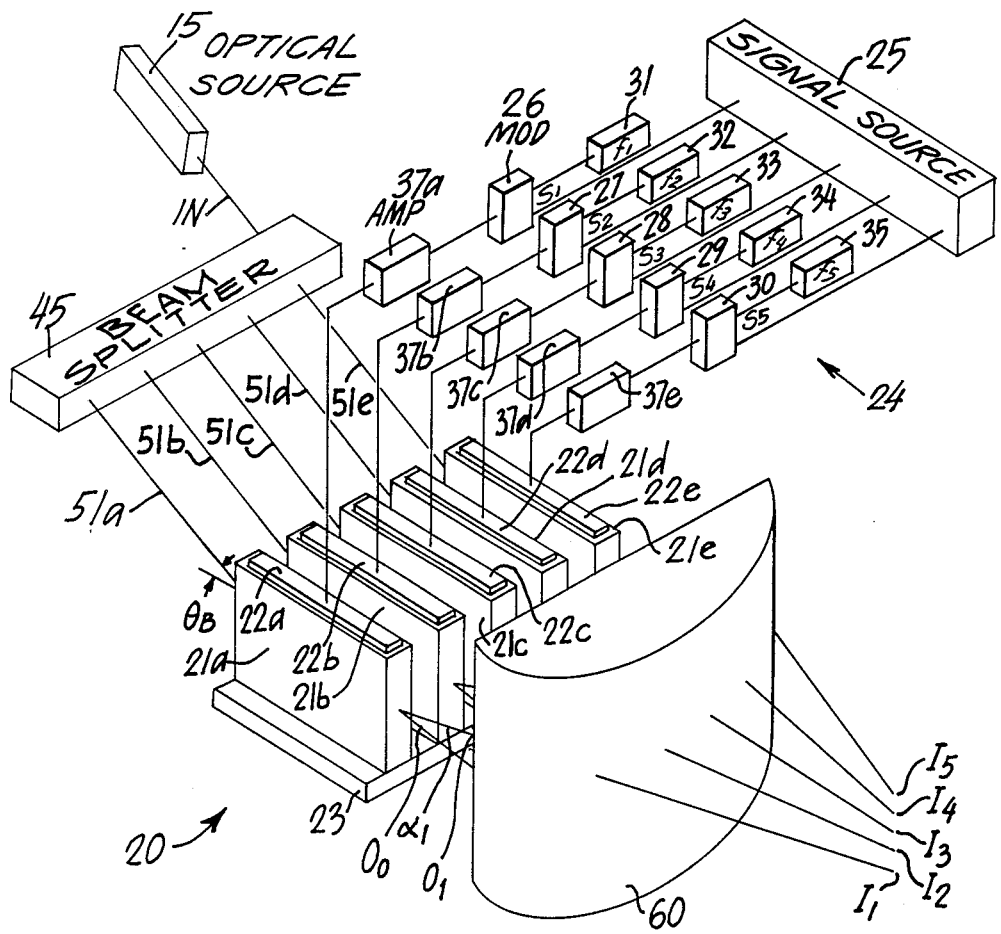
FIG. 4 is a schematic perspective view of an acoustooptic modulation device according to a first embodiment of this invention.

Referring to FIG. 4, an acoustooptic modulation device according to a first embodiment of this invention comprises similar parts designated by like reference numerals. In FIG. 4, the electric signal circuit 24 comprises first through fifth wideband amplifiers 37a, 37b, . . . , and 37e connected to the first through the fifth modulators 26 to 30 which may be amplitude modulators. As in FIG. 1, the first through the fifth carrier signals have the first through the fifth carrier frequencies $f_1$ to $f_5$, respectively, and are supplied to the first through the fifth modulators 26 to 30 responsive to the first through the fifth image signals $S_1$ to $S_5$, respectively. The first through the fifth modulators 26 to 30 carry out amplitude modulation to produce first through fifth modulated electric signals through the first through the fifth amplifiers 37a to 37e, respectively.

The illustrated acoustooptic modulator 20 comprises first through fifth partial modulators supported on the acoustic absorber 23 of aluminum placed in a horizontal plane. As in FIG. 1, the first through the fifth partial modulators comprise first through fifth acoustooptic mediums depicted at 21a, 21b, 21c, 21d, and 21e and first through fifth transducers depicted at 22a, 22b, 22c, 22d, and 22e attached to top surfaces of the acoustooptic mediums, respectively. Each of the first through the fifth acoustooptic mediums 21a to 21e is of a parallelepiped shape of 10×10×1 mm and may be, for example, of a single crystal of lead molybdate (PbMoO$_4$). The first through the fifth acoustooptic mediums 21a to 21e are arranged on the absorber 23 in parallel to one another with a gap left between adjacent mediums.

On the other hand, each of the first through the fifth transducers 22a to 22e may be, for example, of a Y plate of 36° made of a single crystal of lithium niobate (LiNbO$_3$). Each transducer is 0.7 mm wide and 5 mm long. Thicknesses of the first through the fifth transducers 22a to 22e are different from one another so that the first through the fifth transducers 22a to 22e are tuned at the first through the fifth carrier frequencies $f_1$ to $f_5$, respectively. More specifically, the thicknesses of the first through the fifth transducers 22a to 22e are equal to 24.5, 21.0, 18.4, 16.4, and 14.7 micrometers, respectively, in the example illustrated in FIG. 4.

As in FIG. 1, each of the first through the fifth acoustooptic mediums 21a to 21e has entrance and exit surfaces on the lefthand and the righthand sides of this figure.

A beam splitter 45 is disposed between the optical source 15 and the entrance surfaces of the respective acoustooptic mediums 21a to 21e. By way of example, the optical source 15 may be a helium-neon laser for generating a laser beam of a wavelength equal to 632.8 nanometers.

Figure 5:
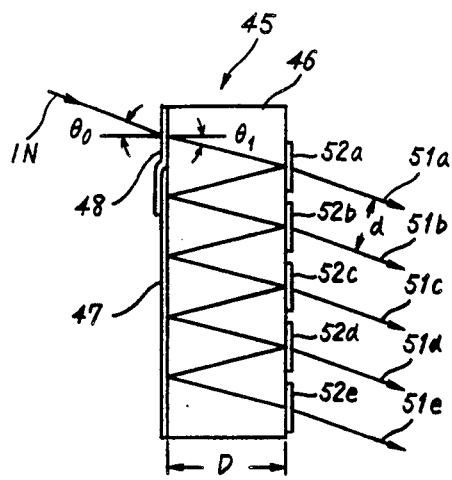
FIG. 5 is a view for use in describing operation of a beam splitter illustrated in FIG. 4.

Referring to FIG. 5 and to FIG. 4 again, the beam splitter 45 comprises a body 46 of synthetic quartz glass which is transparent for the incident light beam IN. The body 46 is of a rectangular parallelepiped shape having first and second principal surfaces which are substantially parallel to each other and which are shown on the lefthand and the righthand sides of FIG. 5, respectively.

The first principal surface has a reflection portion covered with a reflection layer 47 and an incident or entrance portion covered with an antireflection layer 48. The incident light beam IN is incident onto the incident portion at an angle $\theta_0$ with respect to a line perpendicular to the first principal surface and is propagated towards the second principal surface at an angle $\theta_1$ of refraction. As well known in the art, the relationship between the incident angle $\theta_0$ and the angle $\theta_1$ of refraction is given by Snell's law as follows:

$$n\sin\theta_1 = \sin\theta_0,$$

where n represents an index of refraction of the body 46.

The second principal surface has first through fifth outgoing or exit portions through which first through fifth split beams 51a to 51e can be emitted in a manner to be described. The first through the fifth outgoing portions are partially coated with first through fifth semitransparent, namely, translucent layers 52a, 52b, 52c, 52d, and 52e, respectively.

In the beam splitter 45, the incident light beam IN is transmitted to the first semitransparent layer 52a through the antireflection layer 48 and the body 46. The light beam is partially transmitted through the first semitransparent layer 52a as the first split beam 51a and partially internally reflected towards the first principal surface. The internally reflected light beam is again reflected by the reflection layer 47 to be sent to the second semitransparent layer 52b. Like the first semitransparent layer 52a, a part of the light beam incident onto the second semitransparent layer 52b is transmitted as the second split beam 51b through the second semitransparent layer 52b and the remaining part is internally reflected towards the reflection layer 47. Similar operation is repeated to produce the third through the fifth split beams 51c to 51e through the third through the fifth semitransparent layers 52c to 52e, respectively. Thus, the first through the fifth split beams 51a to 51e are in substantially parallel to one another.

It is preferable that the first through the fifth split beams 51a to 51e have luminous energy substantially equal to one another. To this end, reflectivities of the first through the fifth semitransparent layers 52a to 52e are selected so that the first through the fifth split beams 51a to 51e become equal in intensity to one another.

More specifically, let the reflectivities of the first through the fifth semitransparent layers 52a to 52e be represented by $R_1, R_2, \ldots,$ and $R_5$, respectively, on condition that the reflectivity of the reflection layer 47 and internal absorption of the body 46 are equal to 1 and 0, respectively. In addition, it is assumed that the reflectivity of the antireflection layer 48 be equal to zero. The relationships between the reflectivities $R_1$ to $R_5$ should be given by:

$$
\begin{aligned}
(1 - R_1) &= (1 - R_2) \cdot R_1 \\
&= (1 - R_3) \cdot R_1 \cdot R_2 \\
&= (1 - R_4) \cdot R_1 \cdot R_2 \cdot R_3 \\
&= (1 - R_5) \cdot R_1 \cdot R_2 \cdot R_3 \cdot R_4 \, .
\end{aligned} \quad (3)
$$

Otherwise, the luminous energy is varied at each of the first through the fifth split beams 51a to 51e. It is possible to deposit the first through the fifth semitransparent layers 52a to 52e satisfying Equations (3), by stacking a plurality of dielectric films. For example, alternate superposition of titanium dioxide and silicon dioxide films realizes the first through the fifth semitransparent layers 52a to 52e having the reflectivities shown by Equations (3). Similarly, the reflection layer 47 can be formed by alternatingly depositing titanium dioxide films and silicon dioxide films. A metal layer may be coated as the reflection layer 47 on the reflection portion. The antireflection layer 48 may be a stack of dielectric films formed by magnesium fluoride ($MgF_2$), zirconium dioxide ($ZrO_2$), and the like.

In the illustrated beam splitter 45, a mutual distance or pitch d between two adjacent ones of the first through the fifth split beams 51a to 51e is given by:

$$d = (2D/n) \cdot \sin\theta_0, \quad (4)$$

where D represents the thickness of the body 46. Therefore, Equation (4) should be considered so as to give the first through the fifth split beams 51a to 51e to the first through the fifth acoustooptic mediums 21a to 21e, respectively.

Alternatively, the reflection layer 47 may be deposited on the second principal surface while the semitransparent layers 52a to 52e, the first principal surface.

Turning back to FIG. 4, the first through the fifth split beams 51a to 51e are incident onto the entrance surfaces of the first through the fifth acoustooptic mediums 21a to 21e, respectively. The first through the fifth transducers 22a to 22e are individually activated by the first through the fifth modulated electric signals to propagate acoustooptic waves through the first through the fifth acoustooptic mediums 21a to 21e, respectively. The acoustooptic waves have frequencies determined by the frequencies of the first through the fifth carrier signals.

Herein, the first through the fifth split beams 51a to 51e are incident onto the entrance surfaces of the first through the fifth acoustooptic mediums 21a to 21e at the Bragg angles $\theta_B$ relative to wavefronts of the acoustic waves produced by the first through the fifth transducers 22a to 22e, respectively. As a result, the first through the fifth split beams 51a to 51e interact with the acoustic waves in the first through the fifth acoustooptic mediums 21a to 21e so as to be subjected to individual acoustooptic modulation, respectively. The resultant modulated beams are emitted through the exit surfaces of the first through the fifth acoustooptic mediums 21a to 21e as first through fifth exit light beams $O_1$ to $O_5$, respectively.

In FIG. 4, each of the first through the fifth exit light beams comprises a zeroth-order light beam $O_0$ and a first-order diffracted light beam. The first-order diffracted light beams are produced from the first through the fifth acoustooptic mediums 21a to 21e as first through fifth outgoing light beams $O_1$ to $O_5$, although the first outgoing light beam $O_1$ alone is illustrated in FIG. 4.

As in FIG. 1, the first through the fifth outgoing light beams $O_1$ to $O_5$ make first through fifth angles $\alpha_1$ to $\alpha_5$ with the zeroth-order light beams $O_0$, respectively. In the example being illustrated, the first through the fifth angles $\alpha_1$ to $\alpha_5$ are equal to 43.6 mrad (2.50°), 39.2 mrad (2.25°), 34.9 mrad (2.00°), 30.5 mrad (1.75°), and 26.2 mrad (1.5°), respectively. Each zeroth-order light beam is cut by the use of a shield plate because the zeroth-order light beams are useless.

In the above-description, the first through the fifth split beams 51a to 51e are assumed to have luminous energy or intensity substantially equal to one another. The first through the fifth outgoing light beams $O_1$ to $O_5$ can be rendered equal in intensity to one another by controlling the first through the fifth modulated carrier signals even when the first through the fifth split beams 51a to 51e have intensities somewhat different from one another.

Figure 6:
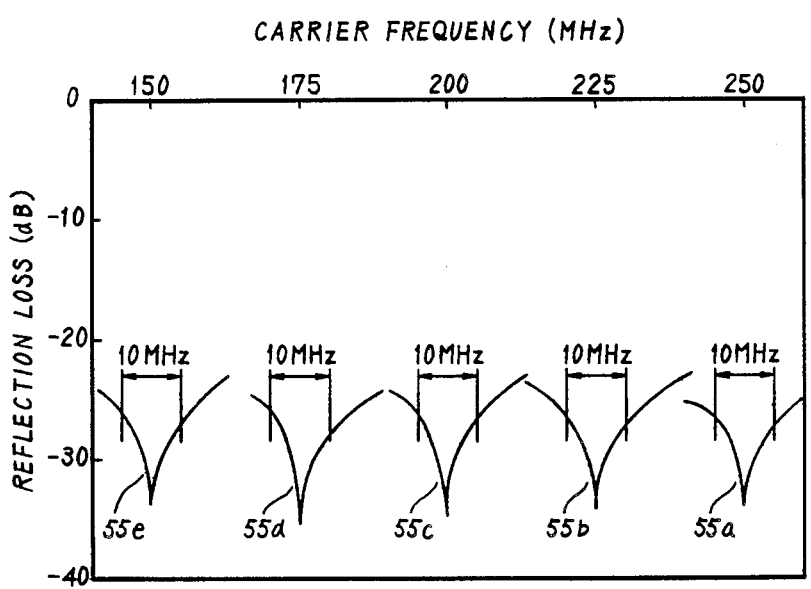
FIG. 6 is a graphical representation for use in describing a characteristic of the acoustooptic modulation device illustrated in FIG. 4.

Referring to FIG. 6, curves 55a through 55e show carrier frequency to reflection loss characteristics of the first through the fifth partial modulators illustrated in FIG. 4, respectively. A frequency band of 10 MHz is assigned to each of the first through the fifth partial modulators to modulate each carrier frequency by each image signals $S_1$ to $S_5$. As readily understood from the curves 55a through 55e, the reflection losses are never higher than −27 dB within each frequency band. Thus, it is possible for the illustrated acoustooptic deflection device to favorably avoid the mismatching of an input impedance of each transducer.

In addition, each of the first through the fifth split beams 51a to 51e is incident onto each entrance surface of the first through the fifth acoustooptic mediums 21a to 21e at an optimum Bragg angle $\theta_{B0}$ determined in relation to each carrier frequency $f_1$ to $f_5$. Therefore, it is possible to avoid a Bragg angle deviation described in conjunction with FIG. 3. As a result, diffraction efficiency is kept substantially invariable over the frequency band between 150 MHz and 250 MHz and each of the first through the fifth outgoing light beams $O_1$ to $O_5$ is substantially invariable in luminous energy, regardless of presence or absence of each image signal.

Referring to FIG. 4 again to FIG. 7, a semicylindrical lens 60 is disposed in front of the respective exit surfaces of the first through the fifth acoustooptic mediums 21a to 21e with a spacing of 200 mm between the exit surfaces and the semicylindrical lens 60. As shown in FIG. 4, the semicylindrical lens 60 has a pair of semicircular end surfaces and planar and curved surfaces between the semicircular end surfaces. Each semicircular end surface defines curvature of the semicylindrical lens and may therefore be called a curvature surface. In FIG. 4, the planar surface is directed towards the respective acoustooptic mediums 21a to 21e and the curved surface is directed away from the mediums 21a to 21e. Thus, the planar and the curved surfaces serve as entrance and exit surfaces of the semicylindrical lens, respectively. This means that each curvature surface is kept parallel to the horizontal surface in the example illustrated in FIG. 4.

As illustrated in FIG. 7(a), the first through the fifth outgoing light beams $O_1$ to $O_5$ are obliquely projected onto the entrance surface of the semicylindrical lens 60 with the mutual distance 1 left therebetween.

The semicylindrical lens 60 is operable to make the first through the fifth outgoing light beams $O_1$ to $O_5$ converge to form images $I_1$ to $I_5$ at a focal point of the semicylindrical lens 60, respectively. As illustrated in FIG. 7(b), the images $I_1$ to $I_5$ are aligned with one another on a straight line with a mutual interval m left therebetween. The mutual interval m is equal to 0.43 mm, by way of example. The mutual interval m can be varied by changing the spacing between the exit surfaces of the respective acoustooptic mediums 21a to 21e and the entrance surface of the lens 60.

Referring to FIGS. 8(a) and 8(b), an acoustooptic medium 21 (suffix omitted) is used as each partial modulator and has an oblique bottom surface 63. In FIG. 8(a), the oblique bottom surface 63 intersects both of the side surfaces of the medium 21 at an acute angle and an obtuse angle, respectively. On the other hand, the oblique bottom surface 63 in FIG. 8(b) intersects with the incident and the outgoing surfaces at acute and obtuse angles, respectively. At any rate, each acoustooptic medium illustrated in FIGS. 8(a) and 8(b) can avoid occurrence of a standing wave resulting from reflection of the acoustic wave. In this case, the acoustic absorber 23 (FIG. 4) is not always attached to the illustrated medium 21.

Such a medium 21 may be of a single crystal of tellurium dioxide or of optical glass, such as FD-6, AOT-5, AOT-44B, or the like manufactured and sold by Hoya Corporation. Thus, it is preferable that the medium 21 is made of a material having an excellent figure of merit with respect to acoustooptic interaction and low internal absorption for an acoustic wave and for the light beam.

Figure 9:
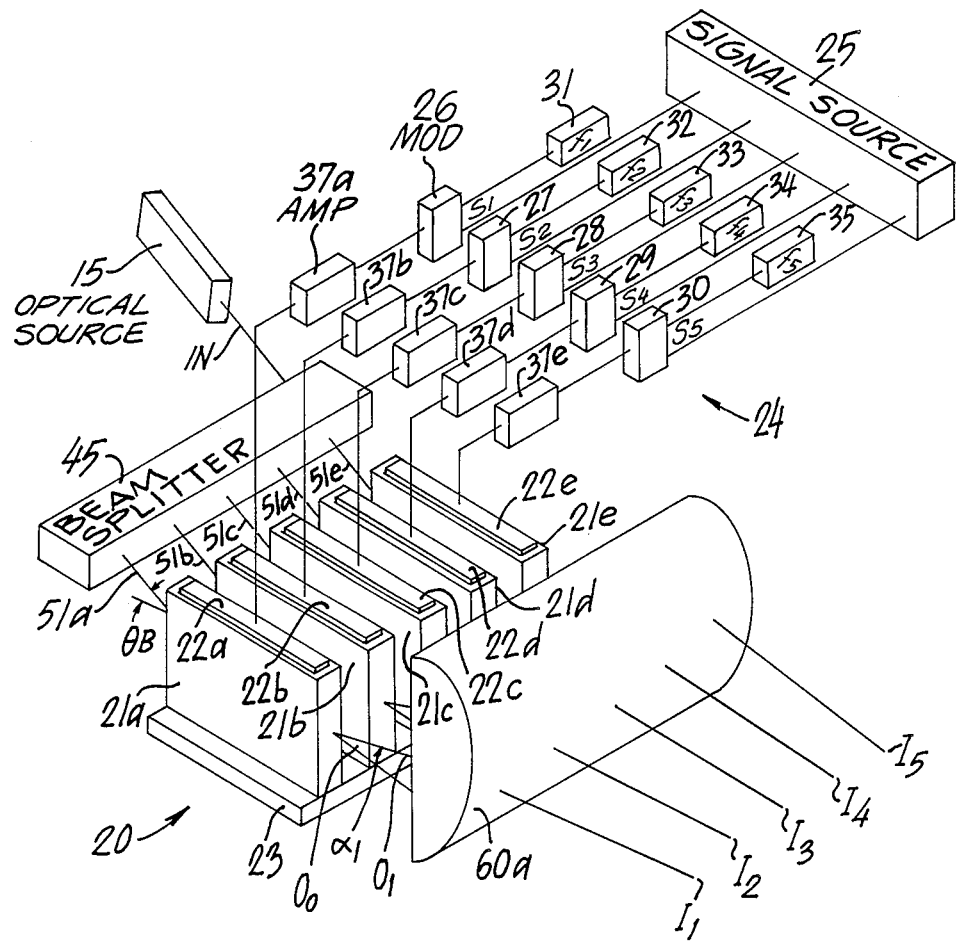
FIG. 9 is a schematic perspective view of an acoustooptic modulation device according to a second embodiment of this invention.

Referring to FIG. 9, an acoustooptic modulation device according to a second embodiment of this invention is similar to that illustrated in FIG. 4 except that the semicylindrical lens 60a (FIG. 9) has a pair of semicircular end surfaces perpendicular to the horizontal plane. As in FIG. 4, the semicylindrical lens 60a has a planar entrance surface directed towards the first through the fifth partial modulators and a curved exit surface directed away from the respective partial modulators.

Referring to FIG. 10 together with FIG. 9, the first through the fifth outgoing light beams $O_1$ to $O_5$ converge at a focal point of the lens 60a to form parallel images $I_1'$ to $I_5'$, as shown in FIG. 10. The parallel images $I_1'$ to $I_5'$ are horizontally arranged at an equal distance 1 from one another without any inclination illustrated in FIG. 7(a).

In FIGS. 4 and 9, the semicylindrical lens 60 or 60a serves to render the images into a predetermined geometric arrangement and may therefore be replaced by any other optical system for forming such a geometric arrangement. For example, such an optical system may comprise an elliptic lens, a cylindrical lens having a pair of concave surfaces extended in parallel to each other along a predetermined duration.

Figure 11:
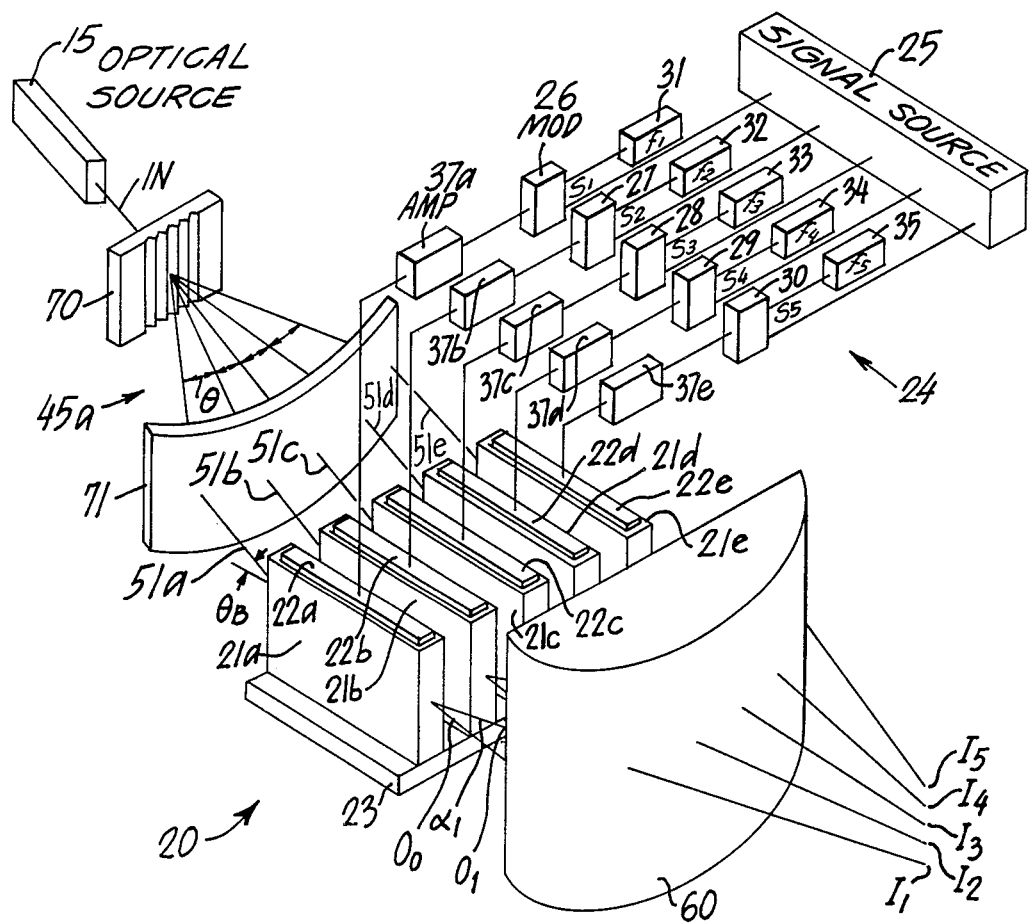
FIG. 11 is a perspective view of an acoustooptic modulation device according to a third embodiment of this invention.

Referring to FIG. 11, an acoustooptic modulator device according to a third embodiment is similar to that illustrated in FIG. 4 except that the beam splitter 45 comprises a phase diffraction grating 70 of optical glass and a lens system 71. The diffraction grating 70 has slits of 12,000/inch and a lattice constant Dc of 21,000 angstroms. As well known in the art, the incident light beam IN is diffracted into a plurality of diffracted light beams appearing with maximum intensities at angular positions $\theta$ defined by:

$$Dc \sin \theta = p\lambda. \tag{5}$$

where p represents the number of the diffracted light beams and $\lambda$, a wavelength of the incident light beam IN. In the example being illustrated, p is equal to five. As a result, the diffraction grating 70 splits the incident light beam IN into first through fifth diffracted light beams substantially equal in intensity to one another. The first through the fifth diffracted light beams are collimated by the lens system 71 to be delivered to the first through the fifth acoustooptic mediums 21a to 21e as the first through the fifth split light beams 51a to 51e, respectively. The illustrated lens system 71 serves to adjust the mutual distance d to 3 mm and may be an elliptic lens.

The diffraction grating 70 may be either of a transmission type or a reflection type.

Figure 12:
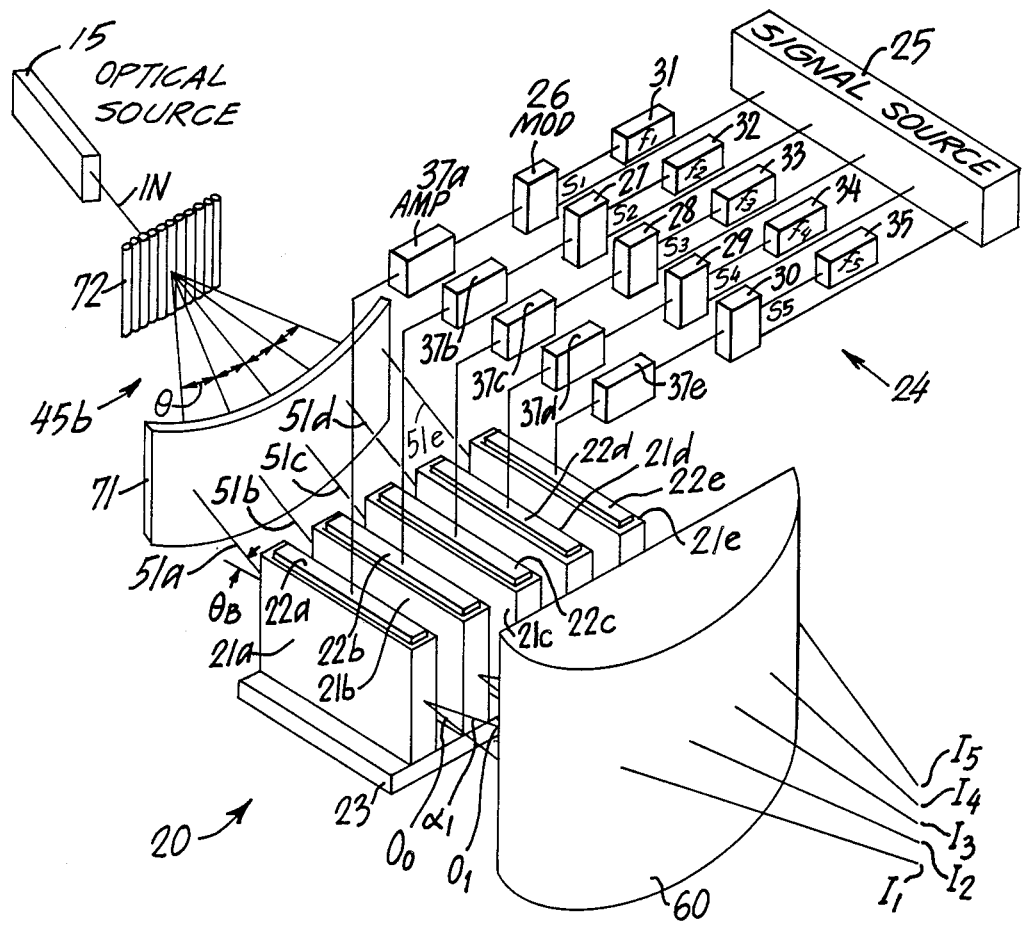
FIG. 12 is a perspective view of an acoustooptic modulation device according to a fourth embodiment of this invention.

Referring to FIG. 12, an acoustooptic deflection device according to a fourth embodiment of this invention is similar to that illustrated in FIG. 11 except that the beam splitter 45b (FIG. 12) comprises a fiber array 72 instead of the diffraction grating 70 (FIG. 11). The fiber array 72 comprises a plurality of optical fibers arranged in parallel with slits left between two adjacent ones of the optical fibers. In the illustrated fiber array, the optical fibers are placed perpendicular to the horizontal plane. The fiber array 72 serves as a grating similar to that illustrated in FIG. 11 and may be a fiber grating. Inasmuch as Equation (5) holds in the fiber grating also, the first through the fifth diffracted light beams are projected from the fiber grating onto the lens system 71 in the manner described in conjunction with FIG. 11. The first through the fifth diffracted light beams are collimated by the lens system 71 as the first through the fifth split light beams 51a to 51e in the manner described in conjunction with FIG. 11.

While this invention has thus far been described in conjunction with several embodiments thereof, it will readily be possible for those skilled in the art to put this invention into practice in various other manners. For example, the number of the split light beams is not limited to five but may be any optional number. The carrier signals may be selected in frequency and bandwidth thereof. Preferably, the highest carrier frequency is less than twice the lowest carrier one in view of suppression of spurious components. In FIGS. 4, 9, 11, and 12, an elliptic lens or the like may be substituted for the semicylindrical lens 60 or 60a, so as to arrange the images in line with or in parallel to one another. In FIGS. 11 and 12, a semicylindrical lens may be used as the lens system 71 instead of the elliptic lens (FIGS. 11 and 12) and the semicylindrical lens 60 may be placed in the manner illustrated in FIG. 9. Thus, it is possible with the illustrated acoustooptic modulation device to reduce the reflection loss and to avoid degradation of the diffraction efficiency. The images can be vertically or horizontally arranged in a predetermined arrangement. In addition, the luminous energy, namely, intensity of the outgoing light beams is kept substantially invariable.

What is claimed is:

1. An acoustooptic modulation device response to a single incident light beam for producting a predetermined number of outgoing modulated light beams subjected to acoustooptic modulation, said acoustooptic modulation device comprising:

beam splitting means for splitting said incident light beam into a plurality of split beams n in number;

a plurality of electric signal producing circuits, n in number, each being for producing an electric data signal;

a plurality of carrier signal producing circuits, n in number, each being for producing a carrier signal having a carrier frequency in a frequency band different from one another, the highest carrier frequency being less than twice the lowest carrier frequency;

a plurality of electrically modulating circuits, n in number, which are responsive to said electric data signals and said carrier signals for electrically modulating said carrier signals by said electric data signals to produce a plurality of modulated electric signals, n in number; and a plurality of acoustooptic modulation elements, n in number, for individually carrying out acoustooptic modulation of said split light beams in response to said modulated electric signals to produce acoustooptically modulated light beams as said outgoing modulated light beams, respectively, said split light beams being incident onto said acoustooptic modulation elements at optimum Bragg angles determined by said carrier frequencies, respectively.

2. An acoustooptic modulation device as claimed in claim 1, wherein said beam splitting means comprises:

a body having first and second planar surfaces parallel to each other, an incident portion on said first planar surface, an outgoing portion on a preselected one of said first and said second planar surfaces, and a reflection portion on another one of said first and said second planar surfaces;

an antireflection layer coated on said incident portion for receiving said incident light beam;

semitransparent layers coated on said outgoing portion and in number n, said semitransparent layers being for partially allowing said split light beams to pass therethrough and for causing reflected light beams to internally occur in said body; and a reflection layer on said reflection portion for internally reflecting said reflected light beams from another planar surface towards said preselected planar surface.

3. An acoustooptic modulation device as claimed in claim 2, wherein said preselected planar surface in said second planar surface.

4. An acoustooptic modulation device as claimed in claim 2, wherein said preselected planar surface in said first planar surface.

5. An acoustooptic modulation device as claimed in claim 1, wherein said beam splitting means comprises:

a diffraction grating responsive to said single incident light beam for emitting n diffracted light beams; and a lens system for rendering said diffracted light beams substantially parallel to one another to produce said split light beams.

6. An acoustooptic modulation device as claimed in claim 1, wherein said beam splitting means comprises:

an optical fiber array for diffracting said single incident light beam into n diffracted light beams; and a lens system for rendering said diffracted light beams substantially parallel to one another.

7. An acoustooptic modulation device as claimed in claim 1, wherein each of said acoustooptic modulation means comprises:

an acoustooptic medium of a parallelepiped having an entrance surface for receiving each of said split light beams, an exit surface for emitting each of said deflected light beams, and a specific surface between said entrance and said exit surfaces for receiving each of said modulated electric signals; and a transducer having a thickness predetermined for said each deflector.

8. An acoustooptic modulation devices as claimed in claim 7, wherein each thickness of said transducers of said deflecting means is different from one another.

9. An acoustooptic modulation device as claimed in claim 1, further comprising:

an optical lens system for making said outgoing light beams converge at a predetermined position in a predetermined geometric arrangement.

10. An acoustooptic modulation device as claimed in claim 9, wherein said predetermined geometric arrangement is a single straight line.

11. An acoustooptic modulation device as claimed in claim 9, wherein said predetermined geometric arrangement is n parallel lines.

* * * * *